United States Patent
McLaren et al.

(10) Patent No.: US 6,552,100 B2
(45) Date of Patent: *Apr. 22, 2003

(54) POSTCURE TREATMENT FOR REACTION INJECTION MOLDED POLYURETHANES

(75) Inventors: John W. McLaren, Waterford, MI (US); Kenneth J. Rettmann, Novi, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/779,157

(22) Filed: Feb. 8, 2001

(65) Prior Publication Data

US 2001/0041754 A1 Nov. 15, 2001

Related U.S. Application Data

(63) Continuation of application No. 09/381,024, filed as application No. PCT/US98/04633 on Mar. 10, 1998, now Pat. No. 6,265,464.
(60) Provisional application No. 60/040,792, filed on Mar. 14, 1997.

(51) Int. Cl.$^7$ .............................. C08J 3/28; C08G 71/02; C08G 71/04
(52) U.S. Cl. ..................... 522/162; 522/166; 522/83; 525/403; 525/452; 525/453; 525/458; 525/528; 528/59; 528/61; 528/65; 528/68; 528/481; 528/503; 264/478; 264/492
(58) Field of Search ................................. 522/111, 112, 522/162, 164, 83; 528/59, 61, 65, 68, 481, 503; 264/478, 492; 525/403, 452, 453, 458, 528

(56) References Cited

U.S. PATENT DOCUMENTS

| 4,013,806 | A | * | 3/1977 | Volkert et al. ............ 427/393.5 |
| 4,070,416 | A | * | 1/1978 | Narahara et al. |
| 4,855,184 | A | * | 8/1989 | Klun et al. .................. 427/331 |
| 4,880,872 | A | * | 11/1989 | Thomas |
| 4,929,483 | A | * | 5/1990 | Halg et al. |
| 5,110,515 | A | * | 5/1992 | Nakamura et al. .......... 264/236 |
| 5,525,681 | A | * | 6/1996 | Barron et al. |
| 5,830,541 | A | * | 11/1998 | Carswell et al. |

FOREIGN PATENT DOCUMENTS

| EP | 0 255 371 | * | 2/1998 |
| WO | 97/12573 | * | 6/1994 |

* cited by examiner

Primary Examiner—Susan W. Berman

(57) ABSTRACT

A method of treating reaction injection molded polyurethane, polyurethane/urea and polyurea polymers comprising exposing a reaction injection molded polyurethane, polyurethane/urea or polyurea polymer to an amount of infrared energy sufficient to increase the temperature of the polymer to at least 175° C., and then maintaining the temperature of the polymer at or above that temperature, for a time sufficient to increase the Gardner impact property, as measured using ASTMD-3029, when compared to the same polymer which has been heated to the same temperature and maintained thereat for the same time in a convection oven. The invention produces marked improvements in impact, heat sag and heat distortion temperature properties, and thus is particularly suited to rapid preparation of parts using a mass production conveyor and is particularly well-suited to preparation of parts which are to be subjected to later high temperature processes, such as the "E-coat" process.

12 Claims, No Drawings

POSTCURE TREATMENT FOR REACTION INJECTION MOLDED POLYURETHANES

This application is a continuation of U.S. patent application Ser. No. 09/381,024 filed Sep. 14, 1999, now U.S. Pat. No. 6,265,464 B1, which claims the benefit of PCT Application No. PCT/US 98/04633 filed Mar. 10, 1998, which claims the benefit of U.S. Provisional Application No. 60/040,792 filed Mar. 14, 1997.

The present invention relates to the field of reaction injection molded polyurethanes, and particularly to a postcure treatment thereof which provides properties improvements.

It is generally known that reaction injection molded polymers, which are generally denominated as polyurethane-related (polyurea and polyurethane/polyurea) polymers, benefit from a postcure treatment after removal from the mold. Postcure treatments generally serve to react residual isocyanate with unreacted polyol and polyamines to complete the polyurethane and polyurea reaction, permit the evolution of entrapped gases for improved paintability, and allow the formation of a lower energy hydrogen bonded network than that which is found in the uncured polymer. This improves the heat distortion properties resulting in better end use performance. The postcure also reduces the amount of time a part needs to react and degas from 3 days to a few hours. In most of this industry, and particularly in the automotive parts portion thereof, this postcuring has been typically achieved by an extended (normally one hour) exposure to heat in a convection oven. Oven temperatures of 140° C. are currently used for curing the polymers selected to prepare automotive fascia. This is obviously time-consuming and relatively energy-intensive, but the significant improvements in the properties noted hereinabove have strongly supported continuation of methods of manufacture incorporating this postcure treatment.

However, one application for these polymers which is currently and rapidly expanding is in the area of vertical body panels. Body panels, which have heretofore been made primarily of steel, must generally be subjected to a widely-used, automotive online prepaint process known as "E-coat", in which an anticorrosion epoxy resin is applied to the steel surfaces and then subjected to oven cure at a much higher temperature, generally in the range of 180-200° C. Use of polymeric body panels presents new challenges, because unless the body panel is sufficiently cured prior to this E-coat process, the higher temperature required for this E-coat process may detrimentally affect the dimensional stability of the panels. However, subjecting the panels to two separate, sequential high temperature processes—a postcure treatment after molding, and a heat treatment as part of the E-coat process—is extremely expensive. This is because the convection ovens required on the conveyor lines in such an approach have to be extremely large and actually have to be heated to temperatures even higher than 200° C. due to the inherent problems associated with convection heating. For example, as the substrate temperature begins to approach the air temperature, heat transfer to the part falls dramatically. This, however, can lead to another problem, which is that using such higher air temperature to assure that the core of the part reaches the desired temperature can result in degradation of the surface of the part. Thus, it is difficult to adequately postcure using such high temperature conveyor lines without encountering problems in polymer quality and without risking poor cure which leads to loss of dimensional stability in subsequent E-coat processing. The alternative, which is to place parts into small, nonconveyor ovens, is also not efficient. The industrial manufacturer therefore needs a method of accomplishing the postcure without relying on high temperature convection ovens, which method can be carried out on conveyorized parts, and which results in a postcure such that subsequent exposure to high temperature convection ovens will not result in unacceptable dimensional changes in the part.

The present invention offers such a method, and further offers unexpected and surprising polymer properties improvements as well. It is a method of treating reaction injection molded polyurethane, polyurethane/urea and polyurea polymers comprising exposing a reaction injection molded polyurethane, polyurethane/urea or polyurea polymer to an amount of infrared energy sufficient to increase the temperature of the polymer to at least 180° C., and then maintaining the temperature of the polymer at or above that temperature, for a time sufficient to increase the Gardner impact property, as measured using ASTMD-3029, when compared to the same polymer which has been heated to the same temperature and maintained thereat for the same time in a convection oven. Preferably the Gardner impact property is increased by at least 25 percent when compared to the same polymer which has been heated to the same temperature and maintained thereat for the same time in a convection oven. More preferably the Gardner impact property is increased by at least 35 percent when compared to the same polymer which has been heated to the same temperature and maintained thereat for the same time in a convection oven. Preferably the polymer is maintained at the desired target temperature (at least 175° C.) from 20 to 35 minutes, and also preferably the temperature of the polymer is increased such that it reaches a level at least −10° C. greater than the highest temperature to which the polymer will be exposed in any subsequent processing, such as the E-coat process. The preferred wavelength is from 0.76 to 2 microns.

Use of the present invention improves important mechanical properties such as impact, heat sag and heat distortion temperature. It also is significantly faster and less expensive when compared with convection heating. Finally, it does not result in degradation of the part surface, since the entire polymer mass is heated essentially simultaneously.

The present invention surprisingly utilizes infrared radiation, which is the form of electromagnetic radiation falling between visible light and radio waves in the electromagnetic spectrum, for its postcure treatment. Infrared radiation is known to provide the highest heat transfer profile, in general, of all types of electromagnetic radiation. Its character is divided by wavelengths, designated as short, medium, and long, and the wavelength for maximum intensity in the "short" wavelength area (known as "high intensity") is from 0.76 to 2 microns.

The mechanism of operation in this new approach is the absorption of the radiation within this limited wavelength range. This absorption by an organic molecule resulted in the excitation of the molecule to a higher energy state, and return of the molecule to its ground energy state resulted in the release of the energy, primarily as heat. While the authors also experimented with broad-band IR exposures (wavelengths concentrated principally in the range of 2.5-15 microns, but with overtone bands ranging from 1-100 microns), performance suggested a strong preference for the wavelengths from 0.76 to 2 microns. The effect of this IR radiation is that the temperature of the polymer is raised much more rapidly than is possible using a convection oven alone, and this rapid temperature rise, followed by maintenance of the temperature thereafter for a brief time, generally 20 to 35 minutes, results in a fully-cured polymer exhibiting superior properties, for example impact resistance and dimensional stability as measured by heat sag, when compared to an identical polymer which has been postcured without the IR treatment, but which instead has been placed in a convection oven for a time sufficient to reach the target temperature, and then maintained at that same temperature for the same amount of time as the IR-treated polymer. In most applications the IR source is able to raise the temperature of the polymer to the desired postcure temperature in 2½; minutes, compared to 15 to 30 minutes using a convection oven. This reduces the size of the oven required to process body panel parts, which is extremely important for use with conveyor lines, and allows use of either the IR source or conventional convection means to carry out the temperature maintenance portion of the process which follows initial heat-up. Typically the IR source and convection oven are combined in one apparatus to perform both portions of the process more or less simultaneously.

The reaction injection polymers to which the infrared radiation is applied include in particular those known as "polyureas" and "polyurethane/ureas", which include generally the stiff, reaction injection molded elastomers used in automotive and durables materials, including furniture, toys, equipment housings. Because there is some dispute as to the amount of polyurea content present in many polymers otherwise categorized as simply "polyurethanes", "polyurethanes" as such are also included in embodiments of the present invention. These polymers have urea groups, urethane groups and/or mixtures thereof. That is, the polymers can be prepared from materials which include or react to form only polyurethane or polyurea groups, or the polymers of the present invention can be prepared from materials which include or react to form both polyurethane and polyurea groups. Other polymer linkages can be formed in the practice of the present invention, too, for example, a polymer having polyurethane, polyurea and isocyanurate groups can be prepared. In general, these polymers are prepared via the reaction of an isocyanate, an isocyanate-reactive material, such as a polyol, and a chain-extender, with additional materials included depending upon the desired end-result. Also included are polyurea/polyurethane polymers prepared from formulations including a polyisocyanate, polyisocyanate-reactive compounds (including polyols and polyamines) and a polyepoxide. These formulations, when postcured at greater than 150° C., exhibit improved heat stability and are described in, for example, U.S. Pat. No. 5,525,681.

The primary isocyanate-reactive material selected for preparation of specifically reaction-injection molded polyurethanes is a hydroxy-functional material, denominated a polyol. Polyols used herein include those prepared from alkylene oxides and an aromatic amine or alkylene oxide initiator. Aromatic amines suitable for preparing these materials can include any di-, or poly-functional aromatic amine. Suitable aromatic amines for initiators include: the isomers of toluene diamine (TDA), which include 2,6-TDA, and 2,4-TDA, for example; isomers of methylene diamine (MDA) which include, for example, 2,2'-MDA, 2,4'-MDA, and 4,4'-MDA; oligomers of MDA which include, for example, mixtures of isomeric compounds having from 3 to 6 aromatic rings; alkyl derivatives of aromatic amines such as 4-methyl-2,6-TDA and isomers of dimethyl-MDA; halogenated derivatives of TDA such as 3-chloro-2,4-TDA; like compounds and mixtures of any of these.

Alkylene oxides suitable for use include oxides having from 2 to 8 carbon atoms, preferably from 2 to 4 carbon atoms. For example suitable alkylene oxides can be ethylene oxide, propylene oxide, 1,2-butylene oxide, 2,3-butylene oxide, styrene oxide, epichlorohydrin, 3-methyl-1,2-butylene oxide, like compounds and mixtures thereof. In the present invention, polymers and copolymers of propylene oxide are preferred.

The chain-extender preferably included in the formulations used in the present invention are preferably selected from low molecular weight diols and triols. Ethylene glycol is particularly useful but other, similar compounds can also be used. Propylene glycol, diethylene glycol, are also suitable for use in the present invention.

Particularly preferred, however, is an amine-containing material, which may be aliphatic or aromatic, but is preferably aromatic in nature. This component can be selected from polyamines and amine-terminated polyols. Diamines having molecular weights of less than 800, preferably less than 500 are conventionally employed.

Preferred amine group containing compounds include the sterically hindered aromatic diamines which contain at least one linear or branched alkyl substituent in the ortho position to the first amino group and at least one, preferably two, linear or branched alkyl substituents containing at least one, preferably one to three carbon atoms in the ortho position to the second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1-methyl-5-t-butyl-2,4-diaminobenzene, 1-methyl-5-t-butyl-2,6-diaminobenzene, 1,3,5-triethyl-2,4-diaminobenzene, 1-methyl-5-t-butyl-2,4-diaminobenzene, 1-methyl-5-t-butyl-2,6-diaminobenzene, 1,3,5-triethyl-2,4-diaminobenzene, 3,5,3', 5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-4-isopropyibenzene and mixtures of the above diamines. Most preferred are mixtures of 1-methyl-3,5-diethyl-2,4-diaminobenzene and 1-methyl-3,5-diethyl-2,6-diaminobenzene in a weight ratio between 50:50 to 85:15, preferably 65:35 to 80:20.

Unhindered aromatic polyamines can be used with the sterically hindered chain extenders and include 2,4- and/or 2,6-diaminotoluene, 2,4'- and/or 4,4'-diaminodiphenylmethane, 1,2'- and 1,4-phenylene diamine, naphthalene-1,5-diamine and triphenyl methane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-Aminobenzene. Liquid mixtures of polyphenyl polymethylene polyamines of the type obtained by condensing aniline with formaldehyde are also suitable.

Generally the nonsterically hindered aromatic diamines and polyamines are too reactive to provide sufficient processing time in preparing polymers such as RIM polyurethanes and polyureas. Accordingly, these diamines and polyamines should be used in combination with one or more of the previously mentioned sterically hindered diamines. One exception to this is the case of methylene diorthochloroaniline. This particular diamine, though not sterically hindered, is a suitable material for preparing RIM polyurethane/polyureas.

The polymer composition also generally includes a polyisocyanate. Any polyisocyanate or polyisocyanate mixture known in the art is suitable for the practice of the present invention. Useful polyisocyanates are described in U.S. Pat. No. 4,785,027, for example. The polyisocyanate can be aliphatic or aromatic. Aromatic polyisocyanates suitable for use herein include: phenyl diisocyanate; 2,4-toluene diisocyanate; 2,6-toluene diisocyanate; ditoluene diisocyanate; naphthalene 1,4-diisocyanate; 2,4'-and/or 4,4'-diphenylmethane diisocyanate (MDI); polymethylene polyphenylenepolyisocyanates (polymeric MDI); like compounds, and mixtures thereof. Suitable aliphatic polyisocyanates include: 1,6-hexamethylene diisocyanate; isophorone diisocyanate; 1,4-cyclohexyl diisocyanate; like compounds and mixtures thereof. Prepolymers prepared by reacting a polyol or chain extender with a polyisocyanate are suitable, as well.

The polyisocyanate can be used in an amount suitable to prepare the reaction injection molded composition with an isocyanate index of from 90 to 130. Preferably, the index is from 100, more preferably 105, to 130, more preferably 110. The isocyanate index is determined by dividing the number of equivalents of isocyanate by the number of equivalents of isocyanate-reactive material, and multiplying the ratio obtained by 100. A polyisocyanate of the present invention can have an average nominal functionality of from 2.0, preferably from 2.5, more preferably 2.6, to 3.5, more preferably 3.3, and more preferably 3.0.

Often included in preparing a reaction injection polymer suitable for use in the present invention are one or more optional components. Such can include, for example, one or more copolymer polyols, polyester polyols, catalysts, fillers, crosslinkers, surfactants, mold release agents, and/or flame retardants. While not required, it is customary to include at least a crosslinker, catalyst and mold release agent, since these materials promote the establishment of good physical properties, including green strength, and enhance the ability of the manufacturer to quickly and easily prepare a succession of parts with limited need for intervening process steps.

Polyurethane catalysts are also suitably used with the present invention. The catalyst is preferably incorporated in the formulation in an amount suitable to increase the rate of reaction between the isocyanate groups of the composition of the present invention and a hydroxyl-reacting species. Although a wide variety of materials is known to be useful for this purpose, the most widely used and preferred catalysts are the tertiary amine catalysts and the organotin catalysts.

Examples of polyurethane catalysts suitable for preparing a polymer which is useful in the present invention are tertiary amine catalysts such as: triethylenediamine; N-methyl morpholine; dimethylethanolamine; pentamethyldimethylenetriamine; N-ethyl morpholine; diethylethanolamine; N-coco morpholine; 1-methyl-4-dimethylaminoethyl piperazine; bis(N,N-dimethylaminoethyl)ether; similar compounds, and mixtures of any of these.

Amine catalysts are usually used in an amount of from 0.1 to 5, preferably from 0.2 to 3 parts per 100 parts of polyol composition, by weight. Organometallic catalysts are also suitable, and examples include organolead, organoiron, organomercury, organobismuth, and preferably organotin compounds. Most preferred are organotin compounds such as dibutyltin dilaurate, dimethyltin dilaurate, stannous octoate, stannous chloride and similar compounds. Organometallic compounds are usually used in an amount from 0.05 to 0.5 parts per 100 parts, by weight, of polyol composition.

Examples of the tertiary amine catalysts include, for example, triethylenediamine, N-methyl morpholine, N-ethyl morpholine, diethyl ethanolamine, N-cocomorpholine, 1-methyl-4-dimethylaminoethyl piperazine, 3-methoxy-N-dimethylpropylamine, N,N-diethyl-3-diethyl aminopropylamine, dimethylbenzyl amine. Tertiary amine catalysts are advantageously employed in an amount from 0.01 to 2 percent by weight of the polyol formulation.

Examples of organotin catalysts include dimethyltin dilaurate, dibutyltin dilaurate, dioctyltin dilaurate, stannous octoate. Other examples of effective catalysts include those taught in, for example, U.S. Pat. No. 2,846,408. Preferably the organotin catalyst is employed in an amount from 0.001 to 0.5 percent by weight of the polyol formulation.

The polymers of the present invention can also be polymer blends and polymer interpenetrating network polymers. For example, a polyurethane of the present invention can be blended with another polymer such as, for example, an acrylonitrile-butadiene styrene polymer and then be electrostatically painted. Other blendable polymers useful with the present invention include but are not limited to nylon, polyethyl terephthalate and polyacrylate. Interpenetrating network polymers can be prepared with polymers of the present invention with materials such as epoxy resins and polycarbonate resins. The network polymers can be prepared by including one or more monomers in the formulations of the present invention such that the materials form a co-continuous or phase segregated in-situ polymer network. Preferably, the urea/urethane group containing polymers are the predominant component of multipolymer compositions of the present invention.

The preferred means of forming the polyurethane/polyurea polymers of the present invention is by means of reaction injection molding (RIM). Preparing RIM polymers is well known in the art, but generally includes the steps of introducing at least two streams of mutually reactive materials through a mixhead into a mold wherein the materials polymerize to produce a molded polymer article. It is conventional for one stream to be the isocyanate component, and the other to be the polyol, chain extender and any optional additional materials such as catalyst, fillers, mold release agents, and so forth; however, in some instances certain optional additional materials may be added to the isocyanate component. Processing of the RIM polymer is typically done in the mold for a time period ranging from 1 to 5 minutes, followed by demold. The polymer is then ready to be treated with the infrared radiation to effect the postcure of the present invention.

Infrared equipment preferably employed can be any infrared radiation source capable of emitting the designated wavelength of radiation. Preferably such equipment is controlled via a non-manual timing means, for optimized commercial processing, and such timing means is determined by temperature measurement. Incorporation of an optical pyrometer to determine temperature is preferred.

The following examples are included to more fully illustrate the present invention; however, they are not intended to be, nor should be construed as being, limitative of its scope in any way. Unless otherwise indicated, all parts and percentages are by weight. ASTM designations for the testing protocols referenced for property determinations are as follows:

| | |
|---|---|
| Specific Gravity | ASTM D-792 |
| Flexural Modulus | ASTM D-790 |
| (wt.) Percent filler | ASTM D-297 |
| Heat Sag | ASTM D-3769 |
| Gardner Impact | ASTM D-3029 |

EXAMPLE 1

A panel was molded in a plaque mold using a Cincinnatti-Milcron HT Reaction Injection Molding (R.l.M.) machine.

The polymer formulation was SPECTRIM HH* with 20 percent RRIMGLOS1**, wollastonite. [*SPECTRIM HH is a trademark of The Dow Chemical Company. **RRIMGLOS1 is a trademark of Nyco Co.] Following demold, one of the panels was then postcured by heating it to 190° C. and holding the temperature at 190° C. for 1 minute using a ITW BGK, Model #2516-48HP infrared oven. The wavelength of the IR energy varied in the range of 0.76 to 2.0 microns. The temperature was monitored by an internal optical pyrometer with an internal feedback control loop. Afterwards, the panel was placed in a convection oven for 30 minutes at 190° C. and then allowed to cool. The resulting properties of the cooled panel are: Specific gravity 1.25, percent filler 20.23, flexural modulus (parallel) 241,679 psi, flexural modulus (perpendicular) 117,522 psi, heat sag 1.0 mm, Gardner impact 46 in-lb.

EXAMPLE 2 (COMPARATIVE)

Another panel prepared via the same procedure and using the same formulation as in Example 1 was postcured in a convection oven. After 30 minutes in the oven, the panel reached a temperature of 190° C. and was then allowed to remain in the oven for 30 minutes at 190° C. The resulting properties of the cooled comparative panel were: Specific gravity 1.25, percent filler 20.23, flexural modulus (parallel) 255,923 psi, flexural modulus (perpendicular) 122,148 psi, heat sag 1.3 mm, Gardner impact 32 in-lb.

EXAMPLE 3

A panel was molded on a Cincinnati Milcron HT reaction injection molding (R.I.M.) machine using a plaque mold using the procedure used in Example 1 and Example 2 (Comparative). The panel was postcured in a ITW BGK Model #2516-48HP infrared postcure oven. The panel reached the postcure temperature of 190° C. in 2 minutes and 20 seconds and was then held at that temperature for 30 minutes. The panel was removed from the oven, cooled and the properties were determined. They were: Specific gravity 1.21, percent filler 19.9, flexural modulus (parallel) 221,942 psi, heat sag 9.3 mm, Gardner impact 46 in-lb.

A panel which had been postcured at the same time was then subjected to 185° C. for 40 minutes in a convection oven to simulate E-coat conditions. The resulting properties after cooling were: Specific gravity 1.23, percent filler 20.3, flexural modulus (parallel) 216,243 psi, heat sag 3.7 mm, Gardner impact 26 in-lb.

EXAMPLE 4 (COMPARATIVE)

Panels molded in the same manner as in the previous examples and comparative example were postcured in a convection oven. The panels reached 190° C. in 30 minutes and were then maintained at this temperature for 30 minutes. The panels were removed from the oven and cooled. The physical properties were determined to be: Specific gravity 1.23, percent filler 20.0, flexural modulus (parallel) 231,382 psi, heat sag 9.7 mm, Gardner impact 28 in-lb.

Another panel, prepared at the same time and postcured in a convection oven, was subjected to an E-coat simulation of 185° C. for 40 minutes. The panels were cooled and then determined to have the following properties: Specific gravity 1.21, percent filler 20.0, flexural modulus (parallel) 223,654 psi, heat sag 6.7 mm, Gardner impact 18 in-lb.

What is claimed is:

1. A method of treating reaction injection molded polyurethane, polyurethane/urea and polyurea polymers comprising exposing a reaction injection molded polyurethane, polyurethane/urea or polyurea polymer to an amount of infrared energy sufficient to increase the temperature of the polymer to at least 175° C., and then maintaining the temperature of the polymer at or above that temperature, for a time sufficient to increase the Gardner impact property, as measured using ASTMD-3029, when compared to the same polymer which has been heated to the same temperature and maintained thereat for the same time in a convection oven.

2. The method of claim 1 wherein the temperature of the polymer is maintained for at least 20 minutes.

3. The method of claim 2 wherein the temperature of the polymer is raised to at least 190° C.

4. The method of claim 1 wherein the polymer is moved to contact the infrared energy by means of a conveyor.

5. The method of claim 1 wherein the temperature of the polymer is maintained by convection oven for at least 30 minutes.

6. The method of claim 5 wherein the temperature of the polymer is raised to at least 190° C.

7. The method of claim 1 wherein the wavelength of the infrared energy is between from 0.76 to 2 microns.

8. The method of claim 1 wherein the polymer being treated is a polyurethane or polyurethane/urea.

9. The method of claim 8 wherein the polymer is the reaction product of an isocyanate, an isocyanate-reactive material and a chain extender.

10. The method of claim 9 wherein the isocyanate-reactive material is a polyol.

11. The method of claim 8 wherein the polymer is prepared from a formulation including a polyisocyanate, polyisocyanate-reactive compound and a polyepoxide.

12. The method of claim 11 wherein the polyisocyanate-reactive compound is a polyol or polyamine.

* * * * *